(12) United States Patent
Petre

(10) Patent No.: US 6,444,159 B2
(45) Date of Patent: *Sep. 3, 2002

(54) BLOW MOLD SHELL AND SHELL ASSEMBLY

(75) Inventor: Patrick Petre, Cauville sur Mer (FR)

(73) Assignee: Sidel, Inc., Norcross, GA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/304,903

(22) Filed: May 4, 1999

(51) Int. Cl.⁷ .............................................. B29C 49/64
(52) U.S. Cl. ........................ 264/520; 249/79; 249/102; 425/526
(58) Field of Search ........................... 249/79, 80, 102; 425/522, 526, 529, 541; 264/520

(56) References Cited

U.S. PATENT DOCUMENTS

| 467,881 A | 1/1892 | Fisher |
| 1,409,591 A | 3/1922 | Schavoir |

(List continued on next page.)

FOREIGN PATENT DOCUMENTS

| DE | 1916129 | 10/1969 |
| DE | 2545130 | 4/1977 |
| DE | 2545131 | 4/1977 |
| DE | 2545132 | 4/1977 |
| DE | 2545134 | 4/1977 |
| DE | 2550727 | 5/1977 |
| DE | 2545133 | 6/1977 |
| DE | 3613543 C1 | 12/1986 |
| DE | 3743809 | 1/1989 |
| DE | 3934495 C1 | 12/1990 |
| EP | 256777 | 2/1988 |
| EP | 565917 A1 | 10/1993 |
| FR | 2057196 | 5/1971 |
| FR | 2613979 A1 | 10/1988 |
| FR | 2613979 | 10/1988 |
| FR | 2646802 | 11/1990 |
| FR | 2646802 A1 | 11/1990 |

(List continued on next page.)

OTHER PUBLICATIONS

"Quick–Change Systems Add to Blow Molders' Market Reach," by Patrick A. Toenmeier, Modern Plastics International, Aug. 1991 (pp. 30–31).

(List continued on next page.)

Primary Examiner—Robert Davis
(74) Attorney, Agent, or Firm—Alston & Bird LLP

(57) ABSTRACT

An improved blow mold shell, and a blow mold shell assembly, for use in blow molding containers is disclosed. The blow mold shell comprises an elongate unitary blow mold shell body defining a partial molding cavity, the partial molding cavity having a container neck forming portion and a container body forming portion. A first continuous cooling circuit is defined within the shell with respect to the neck forming portion of the molding cavity. A second separate, and independent, continuous cooling circuit is defined within the shell with respect to the body forming portion of the molding cavity. So constructed, the neck and body portions of a blow mold container may be separately cooled, and/or heat-treated, as desired, during the molding process to allow the sidewall portion of the container to be molded in as thin a sidewall section as possible in contrast to the neck portion of the container. The shell assembly is comprised of two substantially identical ones of the blow mold shells releasably mated to one another, and also includes a base assembly received at the second end of the blow mold shells. The base assembly defines a base portion of the molding cavity, and has a separate cooling circuit for cooling the base forming portion of the molding cavity.

27 Claims, 8 Drawing Sheets

U.S. PATENT DOCUMENTS

| | | |
|---|---|---|
| 2,790,994 A | 5/1957 | Cardot et al. |
| 2,959,812 A | 11/1960 | Allen |
| 3,191,225 A | 6/1965 | Polka |
| 3,380,121 A | 4/1968 | Chittenden et al. |
| 3,601,858 A | 8/1971 | Blanchard .................. 425/526 |
| 3,651,186 A | 3/1972 | Hall |
| 3,753,641 A | 8/1973 | Turner et al. |
| 3,768,948 A | 10/1973 | Horberg, Jr. et al. ......... 249/79 |
| 3,784,344 A | 1/1974 | Korsch |
| 3,802,823 A | 4/1974 | Doughty et al. |
| 3,807,928 A * | 4/1974 | Horberg, Jr. et al. ....... 425/526 |
| 3,843,286 A * | 10/1974 | Horberg, Jr. et al. ....... 425/526 |
| 3,854,855 A | 12/1974 | Pollock et al. |
| 3,857,660 A | 12/1974 | Flynn et al. |
| 3,871,611 A | 3/1975 | Taketa |
| 3,993,427 A | 11/1976 | Kauffman et al. |
| 4,009,979 A | 3/1977 | Martin |
| 4,035,463 A | 7/1977 | Rosenfranz et al. |
| 4,046,498 A | 9/1977 | Appel et al. |
| 4,072,456 A | 2/1978 | Appel et al. |
| 4,092,097 A | 5/1978 | Appel et al. |
| 4,117,050 A | 9/1978 | Appel et al. |
| 4,120,636 A | 10/1978 | Appel et al. |
| 4,151,976 A | 5/1979 | Schurman |
| 4,213,750 A | 7/1980 | Kubota et al. |
| 4,214,860 A | 7/1980 | Kleimenhagen et al. |
| 4,219,526 A | 8/1980 | Mehnert |
| 4,233,022 A | 11/1980 | Brady et al. ................. 425/525 |
| 4,268,242 A | 5/1981 | Natter |
| 4,318,882 A * | 3/1982 | Agrawal et al. ............ 264/520 |
| 4,357,288 A | 11/1982 | Oas et al. |
| 4,472,128 A | 9/1984 | Ruhl |
| 4,500,275 A | 2/1985 | Ruhl |
| 4,568,263 A | 2/1986 | Ruhl |
| 4,701,121 A | 10/1987 | Jakobsen et al. ........... 425/526 |
| 4,702,456 A | 10/1987 | Von Holdt |
| 4,714,421 A | 12/1987 | D'Agostino |
| 4,790,741 A | 12/1988 | Takakusaki et al. |
| 4,822,543 A | 4/1989 | Iizuka et al. ................ 425/526 |
| 4,834,642 A | 5/1989 | Voss et al. |
| 4,861,542 A | 8/1989 | Oles et al. |
| 4,872,827 A | 10/1989 | Noda |
| 5,041,247 A | 8/1991 | Kim |
| 5,064,366 A | 11/1991 | Voss |
| 5,096,404 A | 3/1992 | Janos et al. |
| 5,116,450 A | 5/1992 | Spoo et al. |
| 5,255,889 A | 10/1993 | Collette et al. ............. 249/102 |
| 5,256,341 A | 10/1993 | Denis et al. |
| 5,262,116 A | 11/1993 | Von Holdt, Sr. |
| 5,277,574 A | 1/1994 | Denis et al |
| 5,284,432 A | 2/1994 | Wurzer |
| 5,288,222 A | 2/1994 | Wieser |
| 5,295,804 A | 3/1994 | Dinnan |
| 5,308,223 A | 5/1994 | Denis et al. |
| 5,322,651 A | 6/1994 | Emmer |
| 5,326,250 A | 7/1994 | Doudement ................. 425/541 |
| 5,332,384 A | 7/1994 | Abramat |
| 5,334,007 A | 8/1994 | Denis et al. |
| 5,338,181 A | 8/1994 | Denis et al. |
| 5,342,558 A | 8/1994 | Denis et al. |
| 5,346,386 A | 9/1994 | Albrecht et al. |
| 5,350,289 A | 9/1994 | Martin |
| 5,358,396 A | 10/1994 | Giesen |
| 5,382,157 A | 1/1995 | Denis et al. |
| 5,411,698 A | 5/1995 | Mero et al. ................. 425/526 |
| 5,413,472 A | 5/1995 | Dietterich et al. |
| 5,439,368 A | 8/1995 | Martin |
| 5,551,860 A | 9/1996 | Budzynski et al. |
| 5,551,861 A | 9/1996 | Baldi |
| 5,556,648 A | 9/1996 | Budzynski et al. |
| 5,683,729 A | 11/1997 | Valles ........................ 425/526 |
| 5,968,560 A | 10/1999 | Briere et al. ................ 425/541 |
| 6,113,377 A * | 9/2000 | Clark .......................... 425/195 |

FOREIGN PATENT DOCUMENTS

| | | | |
|---|---|---|---|
| FR | 2653058 A1 | 4/1991 | |
| FR | 2653058 | 4/1991 | |
| FR | 2659265 A1 | 9/1991 | |
| FR | 2659265 | 9/1991 | |
| GB | 1456833 | 11/1976 | |
| GB | 1526492 | 9/1978 | |
| GB | 1546234 | 5/1979 | |
| GB | 2009029 | 6/1979 | |
| GB | 1577034 | 10/1980 | |
| GB | 2240300 A | 7/1991 | |
| JP | 58-36418 * | 3/1983 | ................ 425/526 |
| JP | 62-166469 | 7/1987 | |
| JP | HEI-1-60725 | 4/1989 | |
| JP | 4-137827 | 12/1991 | |
| JP | 5-169522 A | 7/1993 | |
| WO | WO 94/03320 | 2/1994 | |

OTHER PUBLICATIONS

Patent Abstracts of Japan, vol. 12, No. 286 (M–727), Aug. 5, 1988 (Abstract of Japanese Reference 63–062, 710, dated Mar. 19, 1988).
Wentworth Drawings Set 1 (No date).
Wentworth Drawings Set 2 (No date).
Wentworth Drawings Set 3 (No date).
Wentworth Drawings Set 4 (No date).
Wentworth Drawings Set 5 (No date).
Wentworth Drawings Set 6 (No date).
Wentworth Drawings Set 7 (No date).
Wentworth Drawings Set 8 (No date).
Wentworth Drawings Set 9 (No date).
Wentworth Drawings Set 10 (No date).
Wentworth Drawings Set 11 (No date).
Wentworth Drawings Set 12 (No date).
Wentworth Drawings Set 13 (No date).
Wentworth Drawings Set 14 (No date).
Wentworth Drawings Set 15 (No date).
Wentworth Drawings Set 16 (No date).
Wentworth Drawings Set 17 (No date).
Wentworth Drawings Set 18 (No date).
Wentworth Drawings Set 19 (No date).
Wentworth Drawings Set 20 (No date).
Wentworth Drawings Set 21 (No date).
Wentworth Drawings Set 22 (No date).
Wentworth Drawings Set 23 (No date).
Wentworth Drawings Set 24 (No date).
Wentworth Drawings Set 25 (No date).
Wentworth Drawings Set 26 (No date).
Wentworth Drawings Set 27 (No date).
Wentworth Drawings Set 28 (No date).
Wentworth Drawings Set 29 (No date).
Wentworth Drawings Set 30 (No date).
Wentworth Drawings Set 31 (No date).
Wentworth Drawings Set 32 (No date).
Wentworth Drawings Set 33 (No date).
Wentworth Drawings Set 34 (No date).
Wentworth Drawings Set 35 (No date).
Wentworth Drawings Set 36 (No date).
Wentworth Drawings Set 37 (No date).
Wentworth Drawings Set 38 (No date).
Wentworth Drawings Set 39 (No date).
Wentworth Drawings Set 40 (No date).

Wentworth Drawings Set 41 (No date).
Wentworth Drawings Set 42 (No date).
Wentworth Drawings Set 43 (No date).
Wentworth Drawings Set 44 (No date).
Wentworth Drawings Set 45 (No date).
Wentworth Drawings Set 46 (No date).
Wentworth Drawings Set 47 (No date).
Wentworth Drawings Set 48 (No date).
Wentworth Drawings Set 49 (No date).
Wentworth Drawings Set 50 (No date).
Wentworth Drawings Set 51 (No date).
Wentworth Drawings Set 52 (No date).
Wentworth Drawings Set 53 (No date).
Wentworth Drawings Set 54 (No date).
Wentworth Drawings Set 55 (No date).
Wentworth Drawings Set 56 (No date).
Wentworth Drawings Set 57 (No date).
Wentworth Drawings Set 58 (No date).
Wentworth Drawings Set 59 (No date).
Wentworth Drawings Set 60 (No date).
Wentworth Drawings Set 61 (No date).
Wentworth Drawings Set 62 (No date).
Wentworth Drawings Set 63 (No date).
Wentworth Drawings Set 64 (No date).
Wentworth Drawings Set 65 (No date).
Wentworth Drawings Set 66 (No date).
Wentworth Drawings Set 67 (No date).
Wentworth Drawings Set 68 (No date).
Wentworth Drawings Set 69 (No date).
Wentworth Drawings Set 70 (No date).
Toenmeier, Patrick A., "Quick–Change Systems Add to blow Molders Market Reach," Modern Plastics intional Aug. 1991, pp. 30–31.

* cited by examiner

BLOW MOLD SHELL AND SHELL ASSEMBLY

FIELD OF THE INVENTION

This invention relates in general to stretch blow mold machinery, and to the blow molding of containers. More particularly, this invention relates to an improved blow mold shell having separately defined and independent cooling circuits formed as a part thereof for a container neck forming portion, and a container body sidewall forming portion of the shell, respectively, and to a shell assembly comprised of two substantially identical ones of the shells releasably mated to one another.

BACKGROUND OF THE INVENTION

A large number of beverages, as well as a variety of food products, are packaged in plastic bottles and/or containers. Plastic has proven to be readily adapted to being formed into a variety of shapes and sizes, and a variety of plastics can be used to form bottles to package beverages, for example, non-carbonated, carbonated, refrigerated or pasteurized beverages, as well as containers for semi-solid food products, to include mayonnaise and peanut butter.

The plastics used to form these containers may include high density polyethylene ("HDPE") used primarily for forming milk bottles and for industrial applications, for example forming drums, flasks, and toys; polyvinylchloride ("PVC"), the pioneer polymer used in packaging non-carbonated or slightly carbonated beverages; and polyethylene terephthalate ("PET"), which is a lightweight transparent plastic material having superior resistance to impact, heat, and pressure, and which is 100% recyclable. PET is among the most commonly used plastics for packaging non-carbonated and carbonated liquids, to include water, fruit juices, soft drinks, cooking oil, household cleaning products, as well as liquids which may have required pasteurization or hot filling.

PET containers are typically formed in one of three types of blow molding operations. These operations include extrusion blow molding, injection blow molding, and lastly stretch blow molding in which a preheated preform, also known as parison, is placed between a pair of releasably mated shell halves, a stretch rod is extended within the preform to stretch it to the desired length, and air is injected into the preform through the stretch rod to force the preform against a mold cavity defined within and as part of the mold shell halves.

Although the use of PET in the stretch blow molding of containers has proven to be extremely successful and has gained widespread acceptance in the marketplace, the problem persists in the ability to adequately and precisely control the temperature of the molds during the blow mold process such that the thinnest allowable container sidewall is molded during the formation of the bottle or container. The greatest expense, approximately 90%, of forming a PET container is not the machinery itself, but rather is the cost of the PET used to produce the container. As modern stretch blow mold machines are capable of attaining production rates beyond 50,000 bottles an hour for standard and flat bottles, for example those bottles capable of being manufactured by the SBO family of stretch blow mold machines manufactured by Sidel, Inc., if the cost of the PET preform can be minimized, this savings, when taking into account the number of bottles produced in an hour, and over the course of a machine's lifetime, is quite significant.

When blow-molding a PET container it is desirable to mold the upwardly extending neck portion to have a thicker sidewall or cross-section than the elongate sidewall or body portion of the container which extends between the neck and a spaced base portion of the container. It is also desirable that the base portion be molded to have a body section thicker than the sidewall. All that is required of the sidewall is that it posses sufficient structural strength such that it will not rupture during handling or packaging, and will also act as a suitable vapor barrier for sealing the product within the container.

It is known to define a cooling channel within the shell holder or a support plate to which a blow mold shell is fastened so that a cooling fluid is passed through in the cooling channel in the attempt to cool, indirectly, the sidewall of the mold. This, however, has generally proven to be ineffective in attaining the molding of thin sidewall sections. An improved blow mold assembly which formed a cooling channel between the shell holder and the exterior of the mold itself is disclosed in U.S. Pat. No. 3,768,948 to Horberg, Jr. et al. The device of Horberg utilizes the exterior sidewall of the mold shell and a cooperating exterior sidewall of a manifold provided as a part of a shell holder to form a single continuous cooling passageway, which passageway is divided into a number of parallel channels in which fluid is introduced at the neck portion of the mold and allowed to flow along the exterior of the shell until it is discharged approximate the base portion of the mold shell.

An improvement over the device of Horberg, et al. was to provide a cooling circuit defined internally within, and as a part of the mold shell itself. This is illustrated in U.S. Pat. No. 3,601,858 to Blanchard, and in U.S. Pat. No. 5,255,889 to Collette, et al. The problem with these internal cooling circuits, however, is that only a single cooling circuit is provided for cooling both the neck and the sidewall portion of the container, for example, as in Collette, and for also cooling the base of the container as shown in Blanchard. Thus, the ability to separately control the temperature of the mold cavity with respect to the neck and the sidewall portions of the container was not possible. This will result in the sidewall of the container being molded in a thicker section than needed along the body portion of the container, which has the undesirable effect of driving up material costs. Although an improvement over the device of Horberg, et al. for example, these latter two patents still failed to provide a means for adequately cooling the body portion of the container within a unitary shell to allow for the molding of a "thin" sidewall.

Several sectional blow mold shell assemblies have been developed in which a plurality of complimentary shaped mold sections may be mated or stacked together for constructing a mold shell (shell half) of a desired shape and size, with each of the individual mold sections being provided with a separate cooling circuit for heat treatment/stress crystallization purposes. Examples of this type of construction are disclosed in U.S. Pat. No. 4,233,022 to Brady, et al.; U.S. Pat. No. 4,701,121 to Jakobsen et al.; U.S. Pat. No. 4,822,543 to lizuka, et al.; U.S. Pat. No. 5,255,889 to Collette, et al.; and U.S. Pat. No. 5,411,698 to Mero, et al.

The problem with using sectional blow mold shell assemblies, however, is the inherent cost of machining the separate mold sections which together cooperate to form the mold shell, to the required degree of precision for defining a continuously shaped molding cavity without unsightly parting or joint lines between each section in the container where these sections adjoin one another, the complexity of the cooling fluid connections to the mold shell sections, the resultant labor costs involved in assembling these molds, and in changing these molds out when differing shaped and sized bottles and/or packaging containers are to be molded.

What is needed, therefore, but seemingly unavailable in the art, is a unitary blow mold shell with an independent cooling circuit for the neck portion of a molding cavity defined within the shell, and a second independent cooling circuit also defined within the shell for cooling the body or sidewall portion of the container as it is molded. There is also a need for such an improved blow mold shell/shell assembly in which the cooling fluid supply line(s), and fluid discharge line(s), respectively, may be placed in direct sealed fluid communication with these cooling channels without otherwise having to be passed through an intermediate support or holder plate to which the mold shell is otherwise mounted. Lastly, there is a need for an improved method of blow molding containers using such a mold shell which allows for the precise control of the thickness of the sidewall of the container during the blow molding process.

SUMMARY OF THE INVENTION

The present invention provides an improved blow mold shell, a blow mold shell assembly, and a method of blow molding containers which overcome some of the design deficiencies of the known blow mold shells, shell assemblies, and methods. The invention provides a simple, efficient, and cost effective blow mold shell adapted for use in molding containers in which the temperature of a neck forming portion and a body forming portion, respectively, of a partial molding cavity defined within and by the shell may be separately and precisely controlled such that the sidewall of the container may be molded in as thin a cross-section as possible, or desirable.

The improved blow mold shell of this invention is provided as a unitary blow mold shell having a first end and a spaced second end, with an elongate continuous sidewall extending between its first and second ends, respectively. A partial container molding cavity is defined within an interior surface of the blow mold shell. A first cooling fluid circuit or passageway is defined within the shell with respect to a container neck forming portion of the molding cavity, and a second independent cooling fluid circuit or passageway is defined within the shell with respect to the container body forming portion of the molding cavity, which extends in a lengthwise direction between the first and second ends of the shell.

The blow mold shell assembly of this invention is formed by releasably mating two substantially identical ones of the mold shells together. The shell assembly may also be provided with a separate base member constructed and arranged to be received between the two mold shells as they are closed on one another and about a heated plastic preform during the molding process. The base member defines a base forming portion of the container. A separate third cooling fluid circuit or passageway may be defined within the base member to separately cool the base portion of the container.

Due to the unique construction of the blow mold shell and shell assembly described above, an improved method of blow molding a container is provided. This method is particularly well suited for use on a stretch blow machine for forming a container of the type having a neck, a spaced base, and an elongate body extending between the neck and base thereof. The method includes the steps of positioning a preheated tubular preform at a first end of an elongate blow mold shell assembly, stretching the preform in a lengthwise direction from a first end toward the second end of the shell assembly, and injecting pressurized air into the preform to radially expand the preform against a molding cavity defined within and by the shell assembly.

The method also includes the steps of cooling a neck forming portion of the molding cavity by passing a first cooling fluid through a first cooling fluid circuit defined within the mold with respect to the neck forming portion of the mold so that the neck of the container is molded to have a first wall thickness, and separately cooling a body forming portion of the molding cavity by passing a second cooling fluid through a second independent cooling fluid circuit defined within the mold with respect to the body forming portion so that the sidewall of the container is molded to have a second wall thickness along the body of the container.

It is, therefore, an object of the present invention to provide an improved blow mold shell which is constructed such that a neck forming portion of the mold shell can be cooled separately and independently of a body forming portion of the mold shell.

Yet another object of the present invention is to provide an improved blow mold shell which is simple in design and construction, is rugged and durable in use, and is easy to use.

It is to these objects, as well as to the other objects, features and advantages of the present invention, which will become apparent upon reading the specification, when taken in conjunction with the accompanying drawings, to which this invention is directed.

DETAILED DESCRIPTION OF THE PREFERRED EMBODIMENTS

Figure 1:
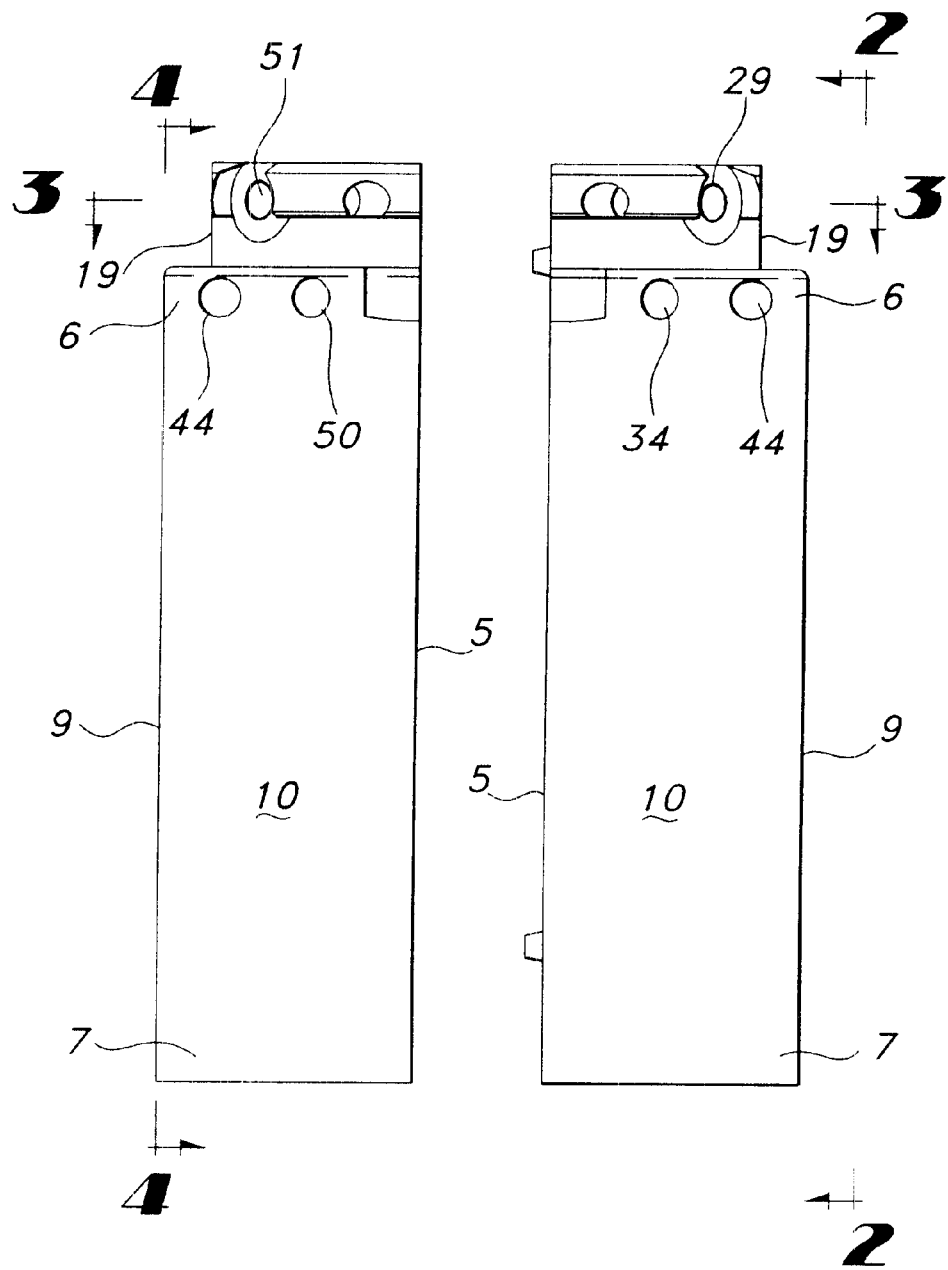
FIG. 1 is a side elevational view of a pair of the blow mold shells of this invention.

The present invention will now be described more fully hereinafter with reference to the accompanying drawings, in which like reference numerals indicate like parts about the several views, and in which preferred embodiments of the invention are shown. It is understood by those skilled in the art that this invention may be embodied in many different forms, and should not be construed as being limited to the embodiments set forth herein. Rather, the embodiments set forth herein are provided so that the disclosure will be thorough and complete, which embodiments will fully convey the scope of the invention to those skilled in the art.

Referring now to FIG. 1, a pair of substantially identical elongate blow mold blow shells 5 are disclosed, which are substantially identical to one another, and may be completely identical if so desired. Each blow mold shell 5 has a first end 6 and a spaced second end 7. Extending between the two ends of the blow mold shell is an elongate sidewall 9 having an outwardly facing exterior surface 10 and an interior surface 11 (shown in FIG. 4). Each blow mold shell 5 is fashioned by being machined from a ductile metal, preferably stainless steel, although other types of steel or metals suited for use as blow mold shells may suffice.

Figure 4:
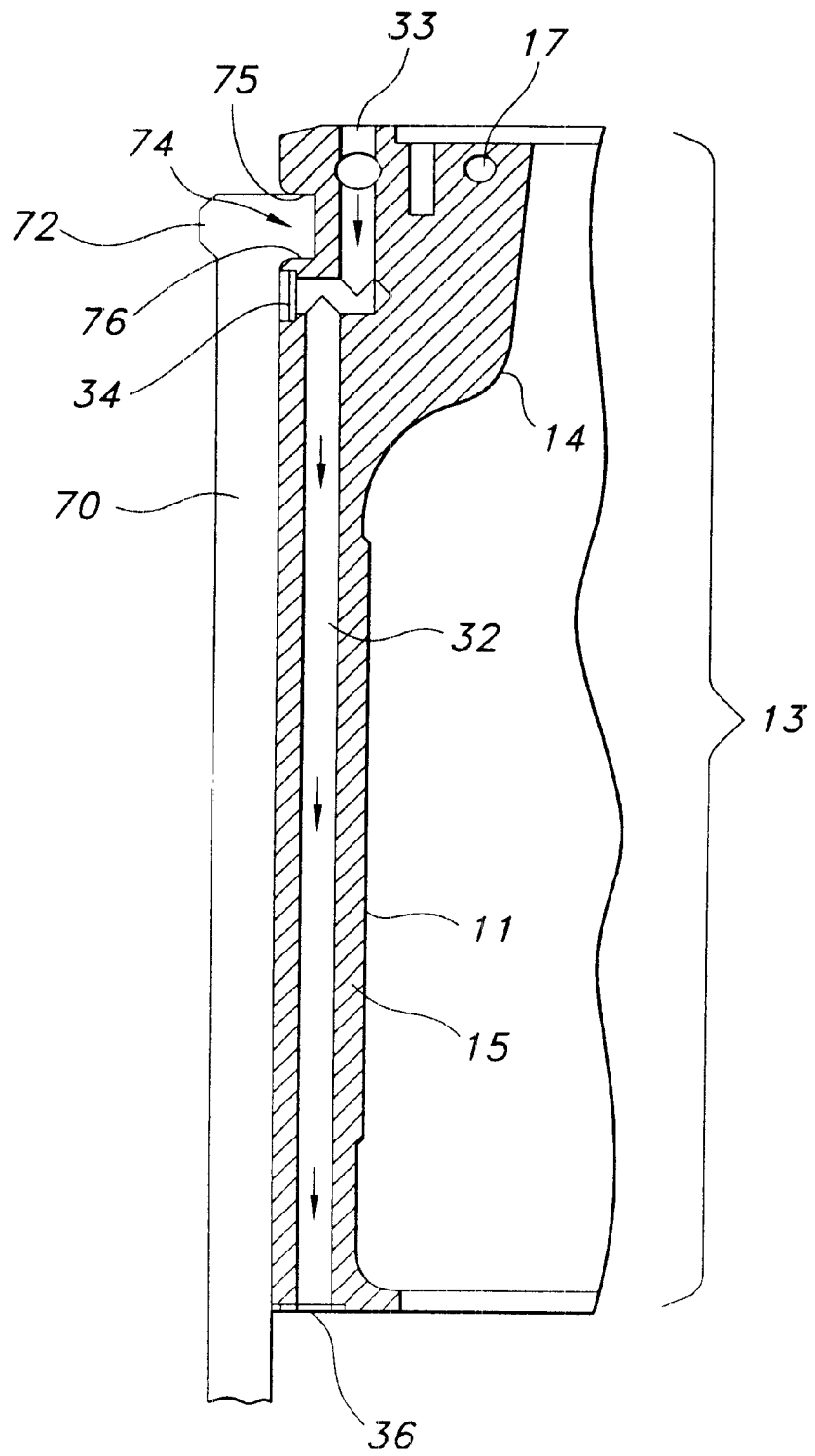
FIG. 4 is a side cross-sectional view along line 4—4 of FIG. 1 illustrating a body cooling circuit within the blow mold shell.
Figure 7:
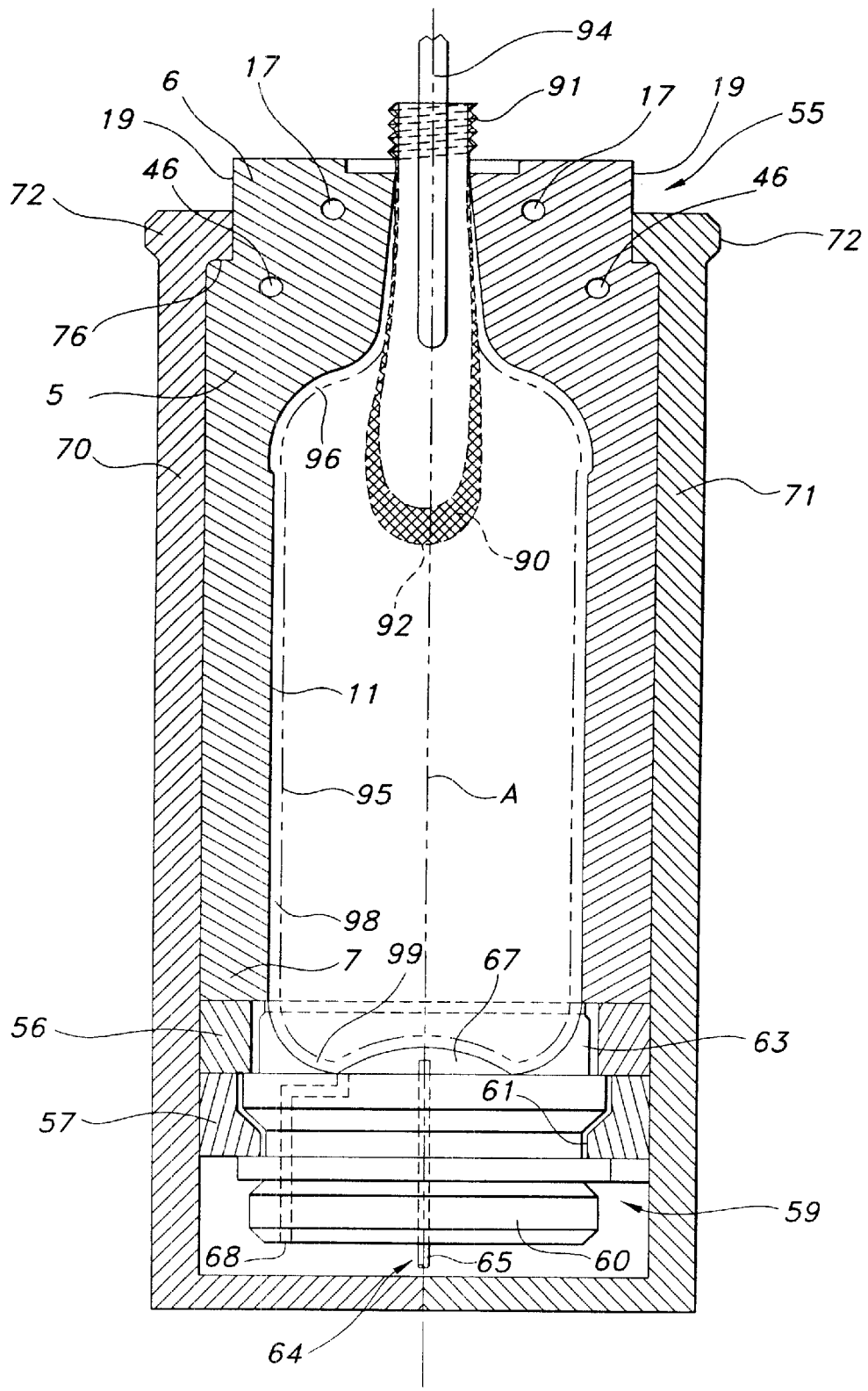
FIG. 7 is a side cross-sectional view of the improved blow mold shell assembly of this invention, illustrating also the differing sectional wall thicknesses of a plastic container blow molded therewith.

As best shown in FIGS. 4 and 7, a partial molding cavity 13 is defined within the interior surface 11 of the blow mold shell. In known fashion, the partial molding cavity will define a container neck forming portion 14 approximate the first end 6 of the blow mold shell, and a container body forming portion 15 extending between the container neck forming portion and the second end 7 of the blow mold shell.

Figure 3:
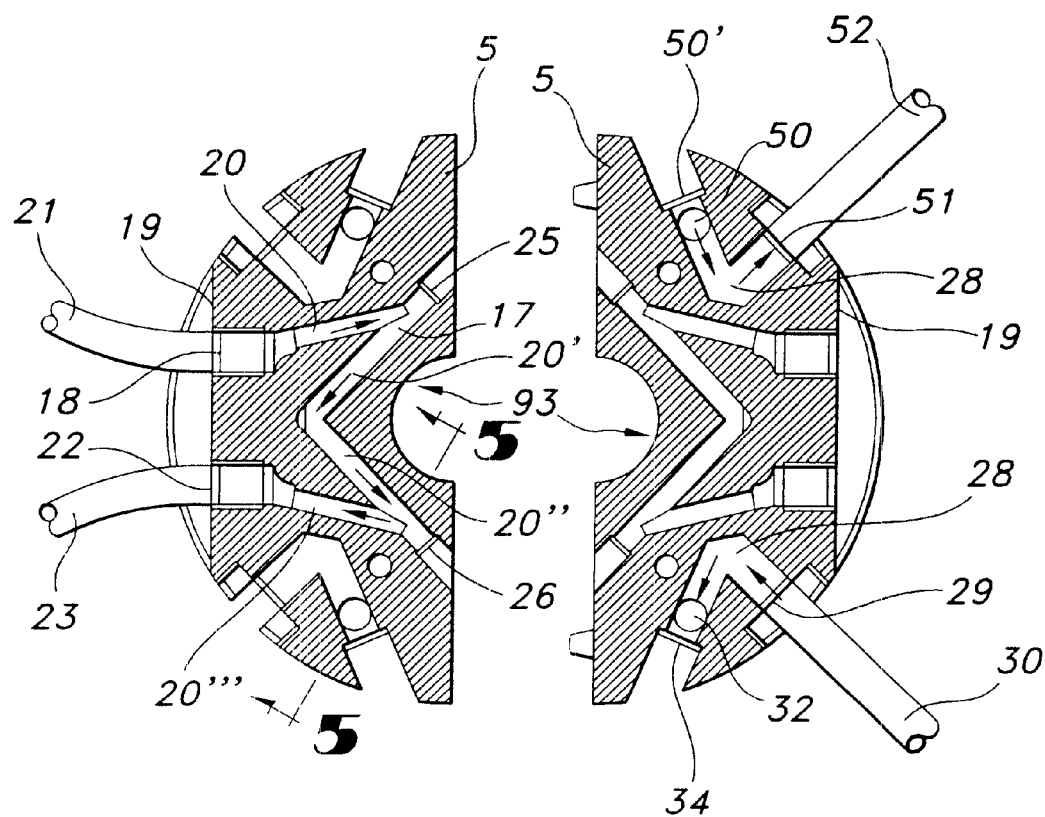
FIG. 3 is a top cross-sectional view along line 3—3 of FIG. 1 illustrating the neck cooling circuit defining within the blow mold shell.

A first cooling circuit 17 is defined internally within, and as a part of, the blow mold shell 5, and is illustrated in FIG. 3. This first cooling circuit is positioned with respect to the container neck forming portion of the partial molding cavity, and is provided for the purpose of cooling the neck forming portion of the molding cavity during the molding of a container therewith. The first cooling circuit is comprised of an inlet port 18 defined within a flat face 19 formed on the exterior surface of the blow mold shell, and at the first end thereof. The cooling circuit extends toward the interior surface of the blow mold shell along a first leg 20 drilled into the shell, which is cross ported into a second leg 20' which is drilled into the shell from the interior surface toward the exterior surface thereof. A mirror image cross port leg 20" is also drilled from the interior surface toward the exterior surface of the shell, and intersects the second leg 20'. Thereafter, a fourth leg 20''' is drilled through a discharge port 22 extending toward, and intersecting the third leg of the neck cooling circuit 20".

The neck cooling circuit thus defines a continuous circuit extending within the shell with respect to the neck forming portion of the shell. It is intended that a cooling fluid will be passed through this cooling circuit, for example water, ethylene glycol, or an ethylene glycol water mix, for example, for the purposes of cooling the container neck forming portion of the molding cavity such that the neck of the container 95 (FIG. 7) is blown to have first wall section thickness 96 as desired. Advantageously, the neck cooling circuit is included closely adjacent the cavity for maximum efficiency in high temperature applications. It is also anticipated that a heat-treatment fluid, for example a heated oil, may be passed through the first cooling circuit rather than a cooling fluid to heat-treat the container being molded.

The first cooling circuit 17 is supplied with cooling fluid through a cooling fluid supply line 21 sealed on to inlet port 18. In similar fashion, a cooling fluid discharge line 23 extends from discharge port 22, and is in sealed engagement therewith. It is anticipated that the supply line and discharge line will each be a length of a flexible fluid-tight hose extending from a supply manifold (not illustrated) provided as a part of a blow mold machine (not illustrated) and into sealed fluid engagement directly with the inlet and discharge ports, respectively, of the blow mold shell. Although it is not illustrated, it is anticipated that, in known fashion, the cooling fluid supply line and the cooling fluid discharge line for the neck cooling circuit of the shell 5 may be passed directly through a shell holder (not illustrated) to which the shell is fastened, rather than through a separate hose or pipeline.

As shown in FIG. 3, the open end of leg 20', as well as the open end of leg 20" of the neck cooling circuit 17 are each sealed by a plug 25, 26, respectively. These plugs 25, 26, will preferably comprise hydraulic seals or other fluid-tight seals which will be press fit into the openings defined within the surface of the shell once the respective legs of the neck cooling circuit have been drilled within the shell body.

Referring now to FIGS. 3–6, a separate, independent second cooling circuit 28 extends along and is spaced with respect to the container body forming portion 15 of the mold shell 5. The second cooling circuit is separate, and independent of the first cooling circuit and thus is operated independently of the first cooling circuit in fashion heretofore unknown in the art within a unitary blow mold shell.

The second cooling circuit 28 begins with an inlet port 29 defined within the exterior surface 10 of the blow mold shell 5. A cooling fluid supply line 30 is received on inlet port 29 in sealed fluid engagement therewith, and preferably comprises a flexible fluid-tight hose, although a rigid pipeline can be used if so desired, as well as for the neck cooing circuit. The inlet port, which is drilled into the body of the shell, includes a side cross port which extends to a first downwardly extending leg 32 of the body cooling circuit. First leg 32 is formed by being drilled downwardly from the top of the shell to a predetermined depth. The side port is drilled into the shell to intersect the top port. An elongate continuous body cooling passageway is drilled within the shell, from the second end 7 toward the first end 6 of the shell, and lies along the body forming portion 15 of the partial molding cavity 13 defined by the shell. The first leg is provided with a top plug 33, a side plug 34, and a bottom plug 36 which together seal the top, side, and bottom openings within the shell drilled to define the first leg 32 of the second cooling circuit. Each of these plugs 33, 34, and 36 will preferably comprise a hydraulic seal, or plug, identical in construction to plugs 25 and 26. Each of plugs 33, 34, and 36 is press fit into its respective opening defined within the exterior surface of the mold shell.

Figure 5:
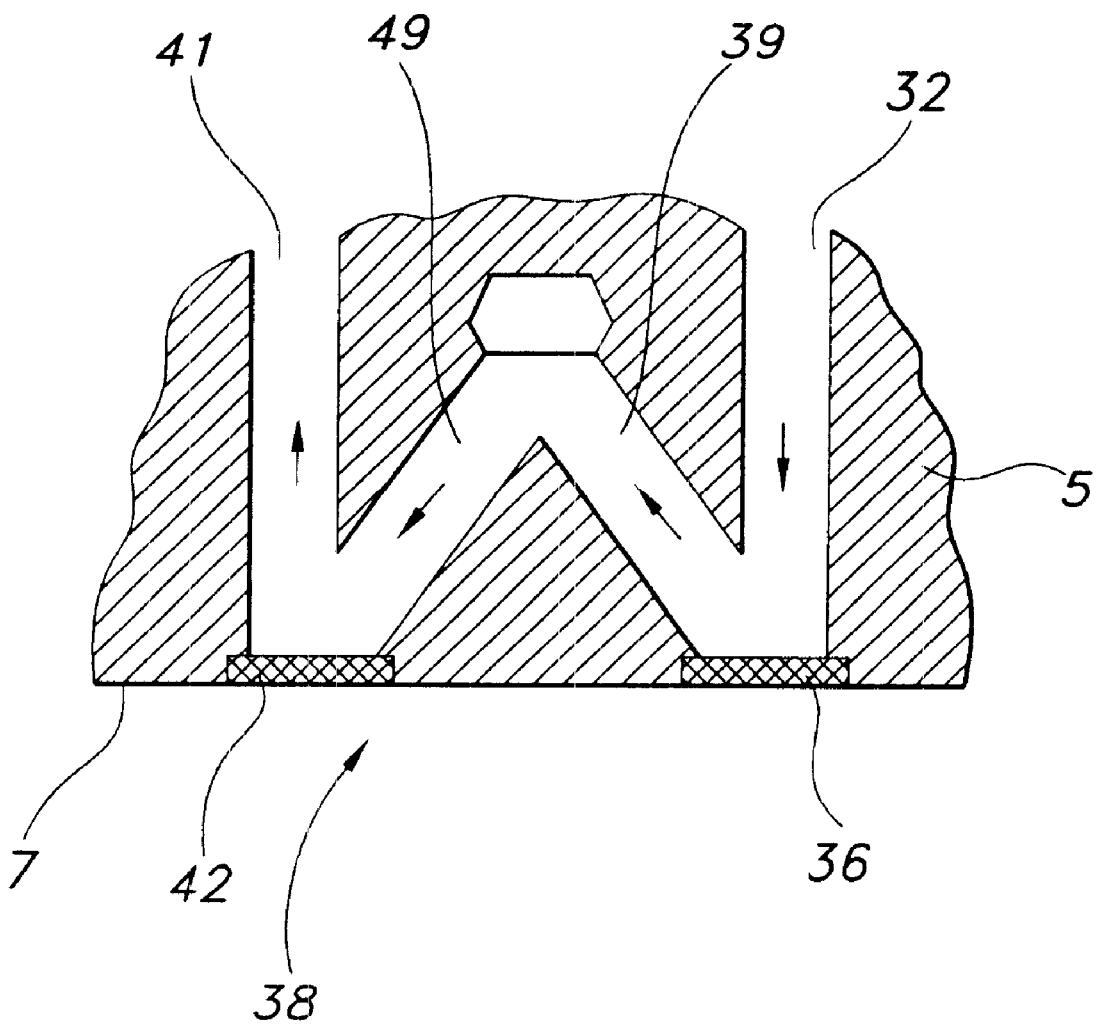
FIG. 5 is a fragmentary side cross-sectional view of an illustrative bottom cross port connection formed as a part of the body cooling circuit within the blow mold shell.
Figure 6:
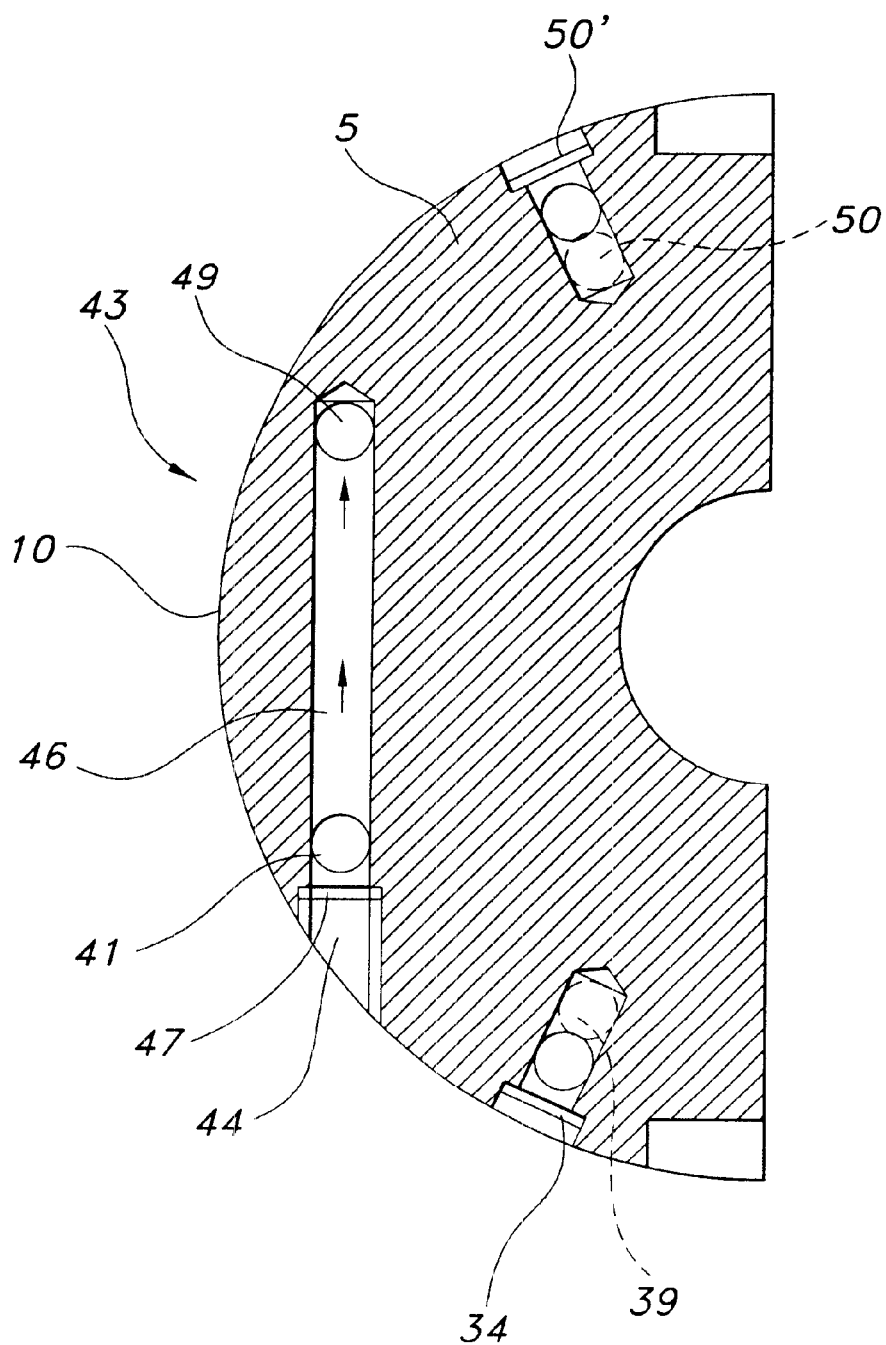
FIG. 6 is a top cross-sectional view along line 6—6 of FIG. 2 illustrating an exemplary top cross port connection within the body cooling circuit of the blow mold shell.

As best shown in FIG. 5, the end of first leg 32 which extends to the second end 7 of the shell is cross ported to an upwardly extending second leg 41 of the second cooling circuit 28 by a bottom cross port connection 38. The bottom cross port connection comprises a first leg 39 drilled into the second end of the shell through the opening at the second end of the shell for the first leg of the second cooling circuit, and a second leg 40 which is extended (drilled) through an opening drilled within the second end of the shell to define the upwardly extending second leg 41 (FIG. 6). These two legs 39 and 40 intercept one another as shown such that a continuous fluid passageway is created for allowing the cooling fluid to pass from first leg 32 to second leg 41 of the body cooling circuit. The bottom cross port connection includes a bottom plug 42, preferably a hydraulic seal, for plugging the opening used to define the second leg 40 of the cross port connection and the second leg 41 of the second cooling circuit. The opening at the bottom of the first leg of the cooling circuit is plugged with the plug 36, as described above.

The second leg 41 of the body cooling circuit extends upwardly along and with respect to the body forming portion of the mold cavity defined by the shell until it intersects a top cross port connection 43 illustrated in FIG. 6. The top cross port connection is defined by an opening 44 which is drilled into the exterior surface of the blow mold shell, and extends as an elongate continuous longitudinal bore 46 drilled into the shell intermediate the first and second ends of the shell. Once the bore is drilled, the open end 44 thereof is plugged with a hydraulic seal or plug 47 constructed in fashion identical to plug 42, as well as plugs 36, 34, and 33 described above. So constructed, the cooling fluid which passes upward along second leg 41 will pass along the longitudinal bore 46 toward a third leg 49 of the second cooling circuit, the third leg 49 being drilled within the shell in fashion identical to the second leg 41, and extending along and spaced with respect to the body forming portion of the molding cavity toward a second bottom cross port connection (not illustrated), preferably constructed in fashion identical to bottom cross port connection 38 of FIG. 5.

Thereafter, extending upwardly from the second bottom cross port connection will be a fourth leg 50 (FIGS. 3, 6) of the second cooling circuit which extends upwardly to a discharge port 51 (FIG. 3) drilled into the exterior surface of the mold shell in fashion similar to the formation of inlet port 29. Fourth leg 50 is formed within the shell 5 identically to the formation of first leg 32, to include the requisite bottom, side, and top ports and plugs, such as side plug 50' (FIG. 3), for sealing the passageway within the shell. A cooling fluid discharge line 52 in sealed fluid engagement with the discharge port extends away therefrom, and preferably comprises a length of flexible fluid-tight hose, although rigid piping may be used if so desired.

So constructed, a first cooling fluid may be passed through the first cooling circuit 17, through the inlet port 18, and exiting therefrom through the discharge port 22 for cooling the neck forming portion of the molding cavity. A second separate cooling fluid, which may again comprise water, ethylene glycol, or a water ethylene glycol mix, or any other suitable cooling fluid, and which may also include heating fluids, for example heated oils, for either the neck or body looking circuits, is passed continuously through the shell by being introduced into the shell through inlet port 29, passing downwardly along the shell from the first end toward the second end thereof along first leg 32, porting over to the second leg through the bottom cross port connection 38, and passing upwardly along second leg 41 to the top cross port connection 43. The cooling fluid then passes along the longitudinal bore of the top cross port connection to the third leg 49, and passes downwardly therein to a second bottom cross port connection, whereupon the fluid is passed upwardly within the shell through the fourth leg 50, along and with respect to the body forming portion 50 of the molding cavity, and exits the shell through discharge port 51. Thus, advantageously cooling fluids may be passed through both the first cooling circuit 17 and the second cooling circuit 28. Alternatively, a cooling fluid may be passed through cooling circuit 17 and a heating fluid may be passed through the second cooling circuit 28, or vice versa.

A blow mold shell assembly 55 constructed of two of the blow mold shells 5 is illustrated in FIG. 7. The blow mold shell assembly is formed by taking two substantially identical ones of blow molds shells 5, the shells need not be identical, but is anticipated that they typically will be, which are releasably mated to one another in known fashion such that the two partial molding cavities 13 (FIG. 4) thereof, will define a blow mold cavity about a longitudinal axis denoted by the reference character "A" in FIG. 7. An annular spacer collar 56 is fastened to the second end of each blow mold shell 5, typically by being screwed thereto. The spacer collar sits intermediate the second end of the blow mold shell, and an annular locking collar 57 sized and shaped for receiving a base assembly 59 therein in locking fashion.

Base assembly 59, as shown in FIG. 7, is conventionally constructed and includes a pedestal 60 defining a continuous locking ring 61 therein for being received by the locking collar 57 of the two mold shells 5 as the mold shells are closed about the plastic (PET) preform 90, shown in phantom lines, used to blow mold a container. A continuous base forming portion 63, known to those skilled in the art as the "crown" of the container, is removably affixed to the pedestal 60, and defines the base portion of the container 95 that will be blow molded therein. In known fashion, a third cooling circuit 64 is defined within the base assembly 59, which includes an inlet passageway 65 defined within the pedestal, a cooling passageway and/or chamber 67 formed within the base assembly along and with respect to the base forming portion 63 of the mold assembly, and a discharge passageway 68 extending away therefrom. Base assembly 59 is reciprocally moved toward and away from the second end of the mold shells in known fashion.

Still referring to FIG. 7, the two blow mold shells 5 are supported on a respective one of a first shell holder 70, and a second shell holder 71. These two shell holders are each fastened to a blow mold machine (not illustrated), typically by being fastened to an operating mechanism of the type disclosed in U.S. Pat. Nos. 5,362,250, and 5,683,729, the provisions of each such patent being incorporated herein fully by this reference, so that as the two mold shells are closed about the preform 90 shown in phantom lanes in FIG. 7, they are also closed about the base assembly 59 for forming a substantially closed blow mold cavity used to define the container 95 to be molded therein.

Figure 2:
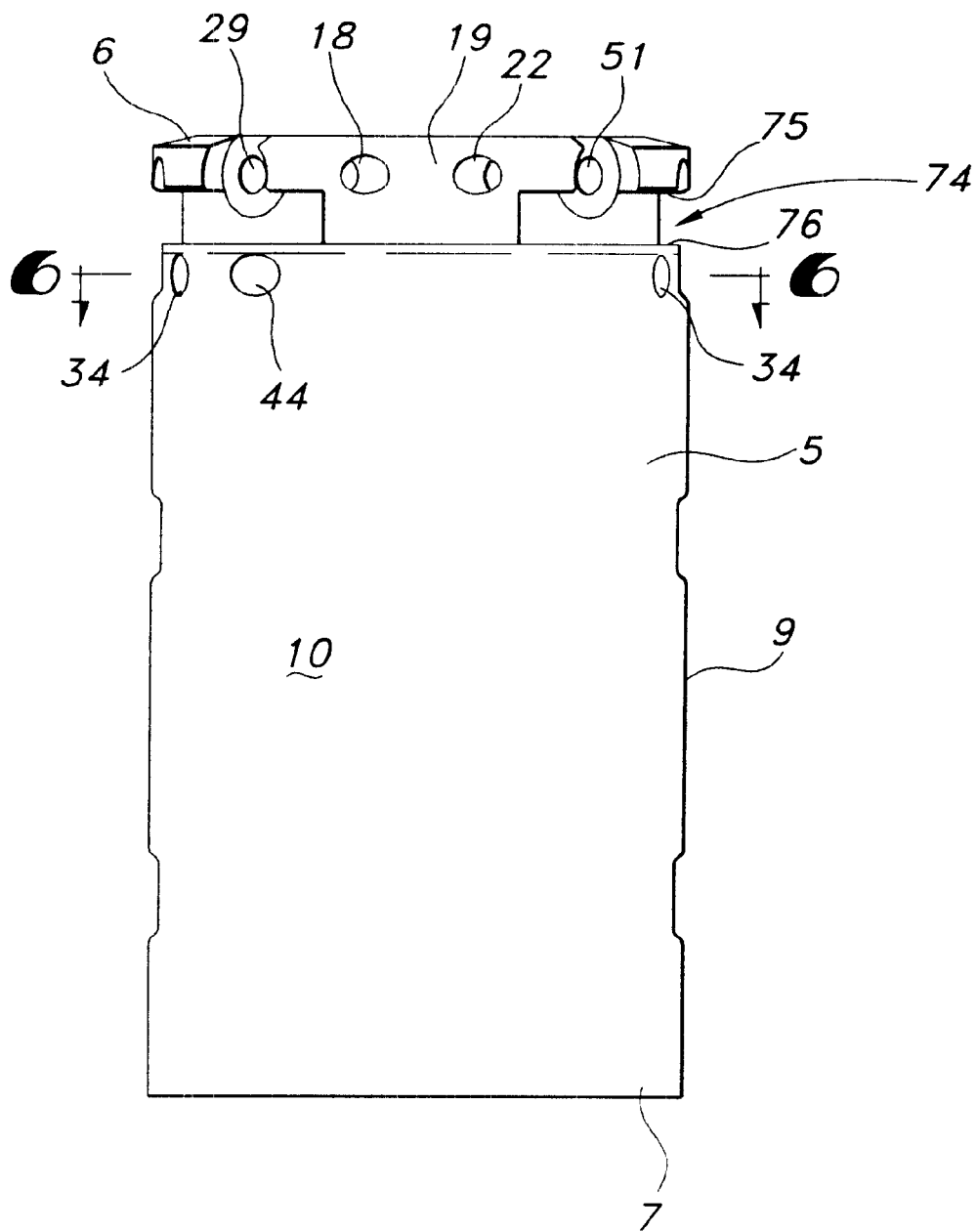
FIG. 2 is an elevational view of one of the blow mold shells of FIG. 1.

Due to the construction of blow mold shell 5 as described above, the cooling fluid supply lines 21 and 30 for the neck and body cooling circuits, respectively, as well as the cooling fluid discharge lines 23 and 52 for the neck and body cooling circuits of the shell, respectively, are at the first end of the shell 6, as best shown in FIGS. 1–3, such that there is not a need to define a cooling fluid supply or discharge line within the shell holders for the purposes of supplying the respective shells. By being constructed in this manner, it is therefore not necessary to have a sealed interface between the shell holder and the shell for passing cooling fluid into and out of the shell, which thus simplifies the changing over of the shells on a blow mold machine when it is desired to change from producing a container of a first size to a container of second differing size.

Also, by constructing the shells in this manner, it is not necessary to purge the cooling circuits within the shells and shell holders prior to changing the shells out. All that is needed is to remove the cooling fluid supply and discharge lines at the first end of the respective shells, remove the shells from the holders, place new shells in the holders, and then fasten the cooling supply fluid and discharge lines to the mold shells. Although not illustrated herein, it is anticipated that the respective cooling fluid supply and discharge lines which are in sealed fluid engagement with the shell can be equipped with a snap fit connector, the snap fit connector having an integral check valve formed as a part thereof, to further speed and simplify the changing over of the mold shells from a first to a second size.

As shown in FIG. 7, each one of shell holders 70 and 71 includes an annular mounting ring 72, i.e. a flange, at the upper end thereof. The mounting ring is sized and shaped to be received within an annular mounting slot 74 defined within the exterior surface 10 at the first end 6 of the blow mold shell 5. The mounting slot is defined by a pair of shoulders 75, 76, as shown in FIGS. 2 and 4.

Although it is not illustrated herein, it is anticipated, if so desired, that the flat face 19 need not be defined within the exterior surface of the shell, rather the inlet port 18 and the discharge port 22 of the neck cooling circuit 17 may be drilled directly into the arcuate exterior surface of the shell, as are inlet port 29 and discharge port 51 of the body cooling circuit. Moreover, it is anticipated that a second annular mounting slot (not illustrated) may be defined within the exterior surface of the shell, spaced parallel to and intermediate the mounting slot 74, and the second end 7 of the blow mold shell so that the blow mold shell of this invention may be easily retrofit to certain of the known types of blow mold machines currently available.

Figure 8:
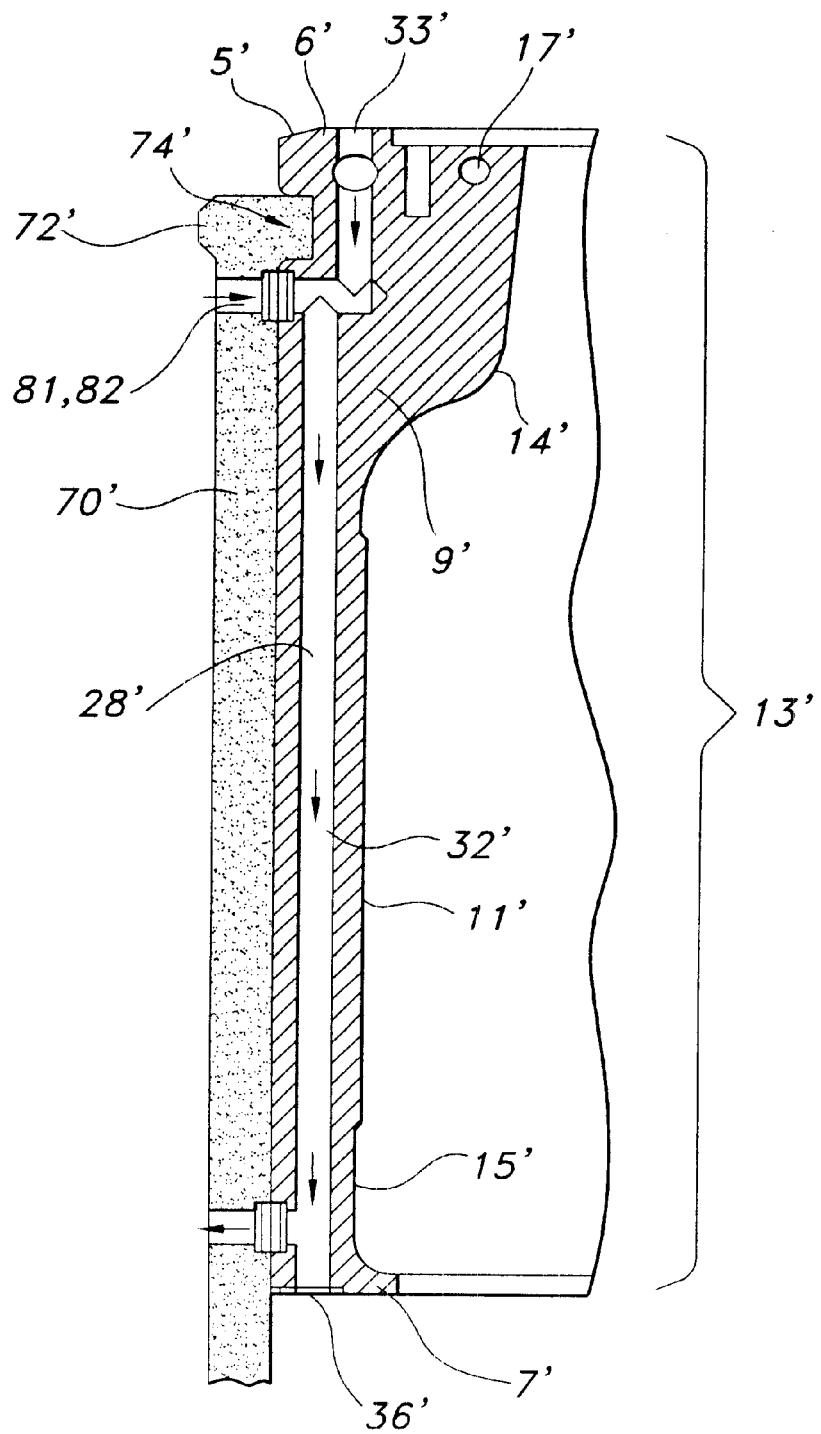
FIG. 8 is a side cross-sectional view of an alternate embodiment of the blow mold shell of this invention.

Referring now to FIG. 8, an alternate embodiment of the blow mold shell 5' having a first end 6' and a spaced second end 7' is illustrated. As with the blow mold shell 5 of FIGS. 1–7, the blow mold shell 5' has an elongate sidewall 9' with an interior surface 11' which defines a partial mold cavity 13' defining a container neck forming portion 14' and container body forming portion 15'. In the same fashion as described for the first blow mold shell 5 in FIGS. 1–7, blow mold shell 5' also has a first or neck cooling circuit 17', and a second or body cooling circuit 28' separately and independently defined within the shell. Here, however, the second cooling circuit 28' is provided with cooling fluid through the shell holder 70', rather than by separate supply lines as shown in FIG. 3.

As shown in FIG. 8, therefore, the shell holder 70' has a fluid supply passageway 81 defined therein which is in registry with the side opening defined (drilled) within the exterior surface of the blow mold shell for the first leg 32' of the second cooling circuit in which the side plug 34 would otherwise be received, as shown, for example in FIGS. 3 and 4. Top plug 33' will plug the top of the first leg 32' of the body cooling circuit, and the bottom plug 36' will plug the bottom of the leg. The body cooling circuit will include two bottom cross port connections identical to that shown in FIG. 5 for the two pairs of legs within the cooling circuit, and a top cross port connection similar to that shown in FIG. 6 as well, although neither of these is illustrated in FIG. 8. The body cooling circuit 28' is thus a continuous cooling circuit as is body cooling circuit 28 described above.

Still referring to FIG. 8, a fluid discharge passageway 82 is defined within shell holder 70' for allowing the cooling fluid to exit from the body cooling circuit 28' through the side port shown drilled for the fourth leg of the cooling circuit. The fluid discharge passageway 82 of FIG. 8 is defined at the top end of the shell holder 70' parallel to supply passageway 81, and is located at the top portion of the fourth leg of the body cooling circuit 28' such that the fluid passes entirely through the cooling circuit before being discharged from the shell through the shell holder. This is accomplished by passing the fluid through the side discharge port drilled into the fourth leg of the body cooling circuit, such that this opening is in registry with the opening is 82 defined within the shell holder 70' for allowing the cooling fluid to pass from the blow mold shell.

Referring to FIG. 7, a tubular PET preform, also known to those skilled in the art as a parison, is illustrated as 90 in phantom line at the upper end 6 of two blow mold shells 5 prior to being molded into a container 95. The PET preform, in known fashion, has a first threaded end 91 and a second closed end 92. The preform will extend along axis A, and is received within a neck opening 93 at the first end of each shell, formed about axis A, as illustrated in FIG. 3. After the PET preform is pre-heated, it is placed within the neck opening 93 of two shells, and the shells are closed about the preform and the base assembly 59 once it has been moved into position upwardly along axis A, such that the shells and the base assembly form a substantially closed blow mold cavity. Once this is done, an elongate stretch rod 94, in known fashion, is sealed on the threaded end of the preform and extended therein so that it stretches the preform toward the second end 7 of the blow mold shells 5. Once this is accomplished, compressed air, or any other suitable fluid, is passed into the preform through the stretch rod, such that the preform expands and takes on the shape of the container neck forming portion 14, container body forming portion 15 (FIG. 4) and the container base forming portion 63 (FIG. 7) of the container 95 illustrated in FIG. 7.

As the neck cooling circuit 17 is controlled separately from the body cooling circuit 28, it is possible to control the temperature of the neck separately from the temperature of the body, so that the body portion of the container is molded to be as thin as possible but yet will posses sufficient structural strength and act as a suitable vapor barrier in order to minimize the amount of PET material used to form the preform and the container.

This is best shown in FIG. 7, which shows a first wall section 96 for the container along the neck/neck forming portion of the molding cavity having a first thickness or section, a thinner second wall section 98 extending along the body forming portion of the molding cavity, namely between the first and second ends of the mold shell, and a thicker third wall section 99 along the base portion of the container. It is anticipated that the neck and base will both be thicker than the sidewall. The base will be cooled separately by the third cooling circuit 64 defined within and as a part of the base assembly 59, such that in this shell assembly, and this method of molding blow mold containers, the neck, the body, and the base of the container are separately cooled and/or heat-heated in fashion heretofore unknown in the art for a unitary blow mold shell.

It will be appreciated that many modifications and other embodiments of the invention will come to mind to one skilled in the art to which this invention pertains, having the benefit of the teachings presented in the foregoing description and the associated drawings. It is thus to be understood that the invention is not to be limited to the specific embodiments disclosed herein, and that many modifications and other embodiments of the invention are intended to be included within the scope of the appended claims. For example, although differing embodiments of the invention have been disclosed herein, it is understood that the neck cooling circuit could also be supplied through the shell holder as is the body cooling circuit, that the neck cooling circuit could be provided through the shell holder and the body cooling circuit provided through flexible hoses, or any possible combination thereof. Moreover, although specific terms are employed herein, they are used in a generic and descriptive sense only, and not for the purpose of limiting the described invention or the claims which follow.

I claim:

1. A blow-mold assembly for use in manufacturing a container on a blow-mold machine, said blow-mold assembly comprising:

a first unitary blow-mold shell having a first end, a spaced second end, and an elongate continuous sidewall extending between said first and second ends, respectively, said sidewall having an interior surface, and an outwardly facing exterior surface;

a partial container molding cavity defined in said interior surface;

a first cooling fluid circuit defined within said shell with respect to a container neck forming portion of said molding cavity; and an independent second cooling fluid circuit defined within said shell with respect to a container body forming portion of said molding cavity extending between the first and second ends of said shell in a lengthwise direction.

2. The blow-mold assembly of claim 1, further comprising a second elongate blow-mold shell, said second shell being substantially identical in construction to said first shell, said first and second blow-mold shells being constructed and arranged to be releasably mated to one another.

3. The blow-mold assembly of claim 2, further comprising a base member defining a container base forming portion of the blow-mold assembly.

4. The blow-mold assembly of claim 3, said base member being constructed and arranged to be held at the respective second ends of said blow-mold shells as said shells are mated to one another.

5. The blow-mold assembly of claim 3, said base member including a third cooling fluid circuit defined therein with respect to said container base forming portion.

6. The blow-mold assembly of claim 1, said first shell further comprising:
   at least one first fluid inlet opening, and at least one first fluid discharge opening, respectively, defined within said shell and in communication with said first cooling circuit; and
   at least one second fluid inlet opening, and at least one second fluid discharge opening, respectively, defined within said shell and in communication with said second cooling circuit.

7. The blow-mold assembly of claim 6, further comprising:
   at least one first cooling fluid supply line in sealed fluid communication with said at least one first fluid inlet opening, and at least one first cooling fluid discharge line in sealed fluid communication with said at least one first fluid discharge opening; and
   at least one second cooling fluid supply line in sealed fluid communication with said at least one second fluid inlet opening, and at least one second cooling fluid discharge line in sealed fluid communication with said at least one second fluid discharge opening, respectively.

8. The blow-mold assembly of claim 7, wherein each respective one of said fluid supply and fluid discharge lines comprises a length of a flexible fluid-tight hose.

9. The blow-mold assembly of claim 6, further comprising:
   a shell holder constructed and arranged to receive said first shell thereon, said first shell being fastened to said first shell holder;
   a first fluid supply passageway and a first fluid discharge passageway, respectively, defined within said shell holder in registry with said at least one first fluid inlet opening and said at least one first fluid discharge opening, respectively; and
   a second fluid supply passageway and a second fluid discharge passageway, respectively, defined within said shell holder in registry with said at least one second fluid inlet opening and said at least one second fluid discharge opening, respectively.

10. The blow-mold assembly of claim 1, said shell further comprising at least one annular mounting slot defined within the exterior surface thereof, said slot being spaced from the first end of the shell and extending perpendicularly with respect to the length thereof.

11. A blow-mold assembly for use in the manufacture of a blow-mold container, the container having a neck, a spaced base, and an elongate body portion extending between the neck and the base thereof, said assembly comprising;
   a first blow-mold shell and a substantially identical second blow-mold shell, each said shell being constructed and arranged to be releasably mated to the other, and including:
   i) a first end, a spaced second end, and an elongate sidewall extending therebetween, the sidewall having an interior surface and an outwardly facing exterior surface;
   ii) a partial container molding cavity defined in said interior surface, said molding cavity defining a container neck forming portion at the first end of the shell and a container body forming portion extending in a lengthwise direction between the respective ends of the shell;
   iii) a first cooling fluid circuit defined within the shell with respect to said neck forming portion, and an independent second cooling fluid circuit defined within the shell with respect to said body forming portion;
   iv) a first fluid inlet opening and a first fluid discharge opening, respectively, defined within the shell and in communication with said first cooling circuit; and
   v) a second fluid inlet opening and a second fluid discharge opening, respectively, defined within the shell in communication with said second cooling circuit.

12. The blow-mold assembly of claim 11, wherein said first cooling circuit is constructed and arranged to cool the neck of the container as it is molded as a first cooling fluid is passed therethrough, and wherein said second cooling circuit is constructed and arranged to cool the body of the container as it is molded as a second cooling fluid is passed therethrough.

13. The blow-mold assembly of claim 11, further comprising:
   a first cooling fluid supply line in sealed fluid communication directly with said first fluid inlet opening and a first cooling fluid discharge line in sealed fluid communication directly with said first fluid discharge opening; and
   a second cooling fluid supply line in sealed fluid communication directly with said second fluid inlet opening, and a second cooling fluid discharge line in sealed fluid communication directly with said second fluid discharge opening.

14. The blow-mold assembly of claim 13, each respective one of said fluid supply and discharge lines comprising a length of a flexible fluid-tight hose.

15. The blow-mold assembly of claim 11, further comprising a base member constructed and arranged to be received between the second ends, respectively, of each said shell as said shells are mated to one another.

16. The blow-mold assembly of claim 15, said base member defining a container base forming portion of the molding cavity, said base member including a third cooling fluid circuit defined therein with respect to said base forming portion, said third circuit having a third fluid inlet opening and a third fluid discharge opening in communication therewith.

17. The blow-mold assembly of claim 16, wherein said third cooling circuit is constructed and arranged to cool the base of the container as it is molded as a third cooling fluid is passed through said third circuit.

18. The blow-mold assembly of claim 11, each said shell further comprising at least one annular mounting slot defined within the exterior surface thereof, said at least one slot being spaced from the first end of the shell and extending perpendicularly with respect to the length of the shell.

19. The blow-mold assembly of claim 11, further comprising a first shell holder and a second shell holder, a respective one of said shells being releasably fastened to a respective one of said shell holders.

20. A blow-mold shell adapted for use as part of a blow-mold assembly, said shell comprising:
- a unitary shell body having a first end, a spaced second end, and an elongate continuous sidewall extending between the first and second ends thereof;
- said sidewall having an interior surface and an outwardly facing exterior surface;
- a partial molding cavity defined in said interior surface, said molding cavity defining a container neck forming portion at the first end of said body, and an elongate container body forming portion extending between the first and second ends of said body in a lengthwise direction;
- a first cooling fluid circuit defined within said body with respect to the neck forming portion of the mold cavity;
- at least one first fluid inlet opening and at least one first fluid discharge opening, respectively, defined within said body and in communication with said first cooling circuit;
- a second cooling fluid circuit defined within said body with respect to and along the body forming portion of said mold cavity; and
- at least one second fluid inlet opening and at least one second fluid discharge opening, respectively, defined within said body and in communication with said second cooling circuit;
- said first and said second cooling circuits being defined within the shell body independently of one another.

21. The blow-mold shell of claim 20, wherein said shell is constructed and arranged to be releasably mated to a substantially identical second one of said shells.

22. The blow-mold shell of claim 20, wherein the second end of said shell is sized and shaped to be at least partially closed about a base member of the blow-mold assembly.

23. The blow-mold shell of claim 20, further comprising at least one annular mounting slot defined within the exterior surface of said body, said slot being spaced from the first end of said body and extending perpendicularly with respect to the length thereof.

24. A method of blow-molding a container on a blow-mold machine, the container having a neck, a spaced base, and an elongate body extending between the neck and the base thereof, said method comprising:
- a) cooling a neck forming portion of a molding cavity partially defined by a unitary mold shell by passing a first cooling fluid through a first cooling fluid circuit defined within the mold shell with respect to said neck forming portion, and molding the neck of the container such that the neck has a first wall thickness; and
- b) cooling a body forming portion of said molding cavity by passing a second cooling fluid through a separate second cooling fluid circuit defined within the mold shell with respect to said body forming portion, and molding the body of the container such that the body has a second wall thickness different than said first wall thickness.

25. The method of claim 24, step b) comprising the step of molding the body of the container so that said second wall thickness is less than said first wall thickness.

26. The method of claim 24, including the steps of providing a base member at the second ends of said mold shells, cooling a base forming portion of the molding cavity defined by said base member by passing a third cooling fluid through a third cooling fluid circuit defined within said base member with respect to said base portion, and molding the base of the container such that the base has a third wall thickness different than said second wall thickness.

27. The method of claim 26, the step of molding the base of the container further comprising the step of molding the base of the container such that said third wall thickness is greater than said second wall thickness.

* * * * *

UNITED STATES PATENT AND TRADEMARK OFFICE
CERTIFICATE OF CORRECTION

PATENT NO. : 6,444,159 B2  Page 1 of 1
DATED : September 3, 2002
INVENTOR(S) : Petre It is certified that error appears in the above-identified patent and that said Letters Patent is hereby corrected as shown below:

<u>Title page,</u>
Item [56], References Cited, U.S. PATENT DOCUMENTS, "Rosenfranz et al." should read -- Rosenkranz et al. --; and insert the following:
-- 3,632,249   1/1972   Pearson --.

Signed and Sealed this

Seventh Day of January, 2003

JAMES E. ROGAN
*Director of the United States Patent and Trademark Office*